United States Patent Office 3,341,628
Patented Sept. 12, 1967

3,341,628
BLENDS OF ISOTACTIC POLYVINYL CHLORIDE AND POSTCHLORINATED ATACTIC POLYVINYL CHLORIDE
Robert Buning and Karl-Heinz Diessel, Troisdorf, Bezirk Cologne, Horst Elsner, Spich, and Hans-Ewald Konermann, Oberlar, Germany, assignors to Dynamit Nobel A.G., Troisdorf, Bezirk Cologne, Germany, a corporation of Germany
No Drawing. Continuation of application Ser. No. 468,119, June 29, 1965. This application Oct. 12, 1966, Ser. No. 586,304
Claims priority, application Germany, Jan. 25, 1962, D 37,989
5 Claims. (Cl. 260—899)

This application is a continuation of application Ser. No. 468,119, filed June 29, 1965, now abandoned, which in turn is a continuation-in-part of application Ser. No. 253,276, filed Jan. 23, 1963, now abandoned.

The subject of the invention is a process for improving the properties of isotactic polyvinyl chloride. The term isotactic polyvinyl chloride describes a polymer of vinyl chloride whose monomeric units have a certain orderly sterical arrangement in the polymer. In contrast thereto, polymers are called atactic when this orderly arrangement is lacking. Atactic polyvinyl chloride can be produced, for example, by suspension polymerization with peroxides at 50° C. Isotactic polyvinyl chloride can be made by several methods, and some of these are described in the following patents: British Patent 855,213, German Auslegeschrift 1,111,826 and French Patents 1,230,844 and 1,259,267. The isotactic polyvinyl chloride can be any isotactic polyvinyl chloride as is known and can be of the various molecular weights known for this material.

Isotactic polyvinyl chloride is also characterized by the softening point, which can be given by the Vicat number (v. H. Houwink, "Chemie und Technologie der Kunststoffe," vol. 1, 3rd Edition (1954), page 652). A high Vicat number indicates a high softening point. The softening point of isotactic polyvinyl chloride (over 100° C.) is considerably higher than the softening point of atactic polyvinyl chloride.

While the high softening point is valuable, isotactic polyvinyl chloride has disadvantages limiting its use. For example, due to its chemical structure it is difficult to work by calendering or in the extrusion press. Also, the worked material is relatively brittle. This brittleness cannot be eliminated by steps used to eliminate brittleness of atactic polyvinyl chloride. Thus, it cannot be eliminated by way of plasticizing by, for example, the addition of butadiene copolymers, or postchlorinated polyethylene.

It has been found that the mechanical properties of isotactic polyvinyl chloride cannot be improved in this manner. On the contrary, upon such treatment, in many cases, the substance becomes more brittle. This shows that isotactic polyvinyl chloride differs substantially from the atactic in this behavior. This is evident furthermore in the solubility. Isotactic polyvinyl chloride is insoluble, though swellable, in tetrahydrofuran, whereas atactic polyvinyl chloride is easily dissolved in this solvent. Another distinctive characteristic is evident in the Vicat number of a mixture of isotactic and atactic polyvinyl chloride. Small additions of about 5 to 10% atactic polyvinyl chloride to the isotactic form greatly reduce the Vicat number, and when 10-20% is added, the Vicat number is even lower than that of atactic polyvinyl chloride.

Now, surprisingly it has been found that, when postchlorinated atactic polyvinyl chloride is added to isotactic polyvinyl chloride, the valuable property of the elevated softening point is retained, while mechanical properties such as brittleness and workability are improved. The softening point of the product, as indicated by the Vicat number, can be substantially as high as the isotactic polyvinyl chloride softening point.

The postchlorinated atactic polyvinyl chloride used in the invention has a chlorine content of between about 62 and 68%, and of the total 1,2-dichloro ethylene moieties and 1,1-dichloro ethylene moieties, on a mol basis, at least 75%, and preferably 90-99%, is 1,2-dichloro ethylene moieties. The K value (H. Fikentscher, Cellulosechemie, 13, 60, (1932)) is between 50 and 90. It is produced by the procedure disclosed in Australian Patent 52,593 of Goodrich Co. The analysis given in the Australian patent applies here also. The postchlorinated atactic polyvinyl chloride can be rolled at 170–190° C. This polymer can be worked on rollers at 170–190° C. The thermal stability is between 60 and 210 minutes by the oven test, described below.

In the oven test the postchlorinated atactic polyvinyl chloride is mixed with 3 wt. percent of a barium, cadmium stabilizer, which is commercially obtainable under the name Ferro 1827, 2 wt. percent lubricant known in the trade as E-Wax, and 0.5 wt. percent calcium stearate. The mixture is calendered for 10 minutes at 190° C. to a 1 mm. thick sheet. The sheet is placed in an oven at 190° C., and starting after 60 minutes, every 20 minutes a sample is taken. The time at which the first brown coloration appears is defined as the thermal stability. It is indicated in minutes.

The proportion of the postchlorinated atactic polyvinyl chloride in the admixture of the isotactic polyvinyl chloride and the postchlorinated atactic polyvinyl chloride can be in the range of about 10–75%. While amounts outside this range, both below and above, can be used, in general in order to realize to a significant extent the advantages of the invention, amounts within the range mentioned are necessary. A preferred range is about 10–50%.

Thus, the invention provides a process for improving mechanical properties of isotactic polyvinyl chloride, and the process comprises admixing with isotactic polyvinyl chloride, postchlorinated atactic polyvinyl chloride of a chlorine content of about 62–68%. These materials are thoroughly distributed in each other and the admixture is a polyvinyl chloride having a softening point at least substantially as high as the softening point for isotactic polyvinyl chloride while the mechanical properties of the admixture are improved with respect to the mechanical properties of the isotactic polyvinyl chloride.

The products made from a material of the present invention are suitable for the manufacture of molded goods of all kinds, sheet materials and even filaments. Molded goods of this kind can also be used at higher temperatures than those made of atactic polyvinyl chloride alone.

EXAMPLE 700 g. of isotactic polyvinyl chloride with a Vicat number of 110° C. (determined on a specimen including no additives, since the addition of stabilizers and lubricants results in a reduction of the Vicat number), 14 g. of lead phthalate, 7 g. of lithium stearate, 7 g. of calcium stearate and 3.5 g. of di-n-heptadecyl-ketone are mixed on a calender for 5 minutes at 170° C. The piece, still hot from the calender, is pressed for 5 minutes at 200° C. into a sheet 4 mm. thick. This material is herein designated Specimen 1.

For Specimens 2–5 the method of working described for Specimen 1 is employed. Instead of 700 g. of isotactic polyvinyl chloride as in Specimen 1, mixtures of that substance with postchlorinated atactic polyvinyl chloride (chlorine content 66%) are used as follows:

Specimen 2: 630 g. of isotactic polyvinyl chloride plus 70 g. of postchlorinated atactic polyvinyl chloride;

Specimen 3: 525 g. of isotactic polyvinyl chloride plus 175 g. of postchlorinated atactic polyvinyl chloride;

Specimen 4: 350 g. of isotactic polyvinyl chloride plus 350 g. of postchlorinated atactic polyvinyl chloride;

Specimen 5: 175 g. of isotactic polyvinyl chloride plus 525 g. of postchlorinated atactic polyvinyl chloride.

The mechanical characteristics of the sheets are summarized in the following table.

| Specimen No | 1 | 2 | 3 | 4 | 5 |
|---|---|---|---|---|---|
| Content of post-chlorinated atactic PVC (percent) | 0 | 10 | 25 | 50 | 75 |
| Tensile strength (kg./cm.²) | 580 | 630 | 650 | 700 | 755 |
| Elongation (percent) | 25 | 25 | 27 | 35 | 46 |
| Tenacity [1] | 53 | 180 | 180 | 180 | 180 |
| Round notch tenacity [1] | 1.8 | 2.7 | 2.9 | 4.7 | 4.7 |
| Vicat number (° C.) | 102 | 104 | 107 | 112 | 116 |

[1] Kilogram-centimeters per sq. cm. at 20° C.

In the table, the Vicat number for Specimen No. 1 is for this material after addition of the additives disclosed for this material.

The percentages herein for the extent of chlorination and the amount of 1,2-dichloro ethylene moieties in the postchlorinated atactic polyvinyl chloride are mol percent. The percentage composition for the admixture of isotactic polyvinyl chloride and postchlorinated atactic polyvinyl chlorides is on a weight basis.

The terms "isotactic" and "atactic" used herein have the meanings given therefor in Linear and Stereoregular Addition Polymers, Gaylord and Mark, Interscience Publishers, New York-London, volume 2, 1959, page 38.

The compositions of the invention can include stabilizers, lubricants and other additives as are known in the art for polyvinyl chloride resins.

The Vicat numbers for isotactic polyvinyl chloride set forth herein are for isotactic polyvinyl chloride containing the usual additives such as for example the isotactic polyvinyl chloride containing additives used in the example, unless otherwise indicated.

While the invention has been described in reference to particular embodiments thereof, various alterations and modifications will occur to those skilled in the art and it is desired to secure by these letters patent, all such modifications as are within the scope of the appended claims.

What is claimed is:

1. Process for improving mechanical properties of isotactic polyvinyl chloride which comprises admixing with isotactic polyvinyl chloride, postchlorinated atactic polyvinyl chloride having a chlorine content of about 62–68%, to thoroughly distribute these materials in each other, the amount of postchlorinated atactic polyvinyl chloride being from a significant amount up to about 75% of the admixture of said postchlorinated atactic polyvinyl chloride and isotactic polyvinyl chloride.

2. Process according to claim 1, wherein the admixture includes about 10–75% postchlorinated atactic polyvinyl chloride.

3. Polyvinyl chloride product containing at least about 25% isotactic polyvinyl chloride and at least about 10% of postchlorinated atactic polyvinyl chloride having a chlorine content of about 62–68%.

4. Polyvinyl chloride product according to claim 3, said product having a softening point at least substantially as high as the softening point for the isotactic polyvinyl chloride, while having improved mechanical properties with respect to the isotactic polyvinyl chloride.

5. Polyvinyl chloride product according to claim 4, said product containing at least about 50% of isotactic polyvinyl chloride.

References Cited

UNITED STATES PATENTS

| 2,230,000 | 1/1941 | Hauffe et al. | 260—899 |
| 3,108,993 | 10/1963 | Christman | 260—92.8 |
| 3,167,598 | 1/1965 | Heaps et al. | 260—879 |

FOREIGN PATENTS 1,351,619  12/1963  France.

MURRAY TILLMAN, *Primary Examiner.*

J. L. WHITE, *Assistant Examiner.*